United States Patent
Oigawa

(10) Patent No.: US 11,037,316 B2
(45) Date of Patent: Jun. 15, 2021

(54) PARALLAX CALCULATION APPARATUS, PARALLAX CALCULATION METHOD, AND CONTROL PROGRAM OF PARALLAX CALCULATION APPARATUS

(71) Applicant: CANON KABUSHIKI KAISHA, Tokyo (JP)

(72) Inventor: Makoto Oigawa, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 145 days.

(21) Appl. No.: 16/364,752

(22) Filed: Mar. 26, 2019

(65) Prior Publication Data

US 2019/0304119 A1  Oct. 3, 2019

(30) Foreign Application Priority Data

Mar. 30, 2018 (JP) .............................. JP2018-067512
Mar. 20, 2019 (JP) .............................. JP2019-052735

(51) Int. Cl.
   *G06K 9/00* (2006.01)
   *G06T 7/593* (2017.01)
   *G06T 7/521* (2017.01)

(52) U.S. Cl.
   CPC .............. *G06T 7/593* (2017.01); *G06T 7/521* (2017.01)

(58) Field of Classification Search
   CPC ..................... G06T 7/593; G06T 7/521; G06T 2207/10152; G06T 2207/30164
   See application file for complete search history.

(56) References Cited

U.S. PATENT DOCUMENTS 6,173,122 B1    1/2001  Matsumoto
6,545,706 B1 *  4/2003  Edwards ................. G06T 7/246
                                                      348/169

(Continued)

FOREIGN PATENT DOCUMENTS

JP    2015-137933    *  7/2015    ............. G01B 11/25
JP    2015-137933 A     7/2015
JP       5803065 B     11/2015

OTHER PUBLICATIONS

Bimber et al, ("The Visual Computing of Projector-Camera Systems", Eurographics 2007) (Year: 2007).*

(Continued)

*Primary Examiner* — Amara Abdi
(74) *Attorney, Agent, or Firm* — Canon U.S.A., Inc. IP Division

(57) ABSTRACT

An apparatus comprises: an acquisition unit that captures an image of a measurement target and acquires an original image pair having a parallax; a reduction unit that reduces a size of the original image pair; and a calculator that calculates, from an image pair obtained by the reduction unit, a parallax map using predetermined search ranges and search windows in the respective regions. In order to obtain a parallax map that has a predetermined number of pieces of data, the calculator calculates parallax maps in a plurality of hierarchies in which a hierarchy where a parallax map is calculated using an image pair with a lowest magnification is set as a lowest hierarchy, and the predetermined search ranges for calculating the parallax maps in the respective hierarchies are determined based on a parallax map in an immediately lower hierarchy.

19 Claims, 12 Drawing Sheets

(56) References Cited

U.S. PATENT DOCUMENTS

| | | | |
|---|---|---|---|
| 7,098,998 | B2 | 8/2006 | Terauchi |
| 9,167,151 | B2 | 10/2015 | Shu |
| 9,197,808 | B2 | 11/2015 | Hamano |
| 9,501,692 | B2 | 11/2016 | Tyagi |
| 10,076,425 | B2 | 9/2018 | Farina |
| 10,681,260 | B2 | 6/2020 | Yamazaki |
| 2013/0050187 | A1* | 2/2013 | Korcsok .............. H04N 13/111 345/419 |
| 2015/0103149 | A1* | 4/2015 | McNamer .......... H04N 5/23293 348/50 |
| 2016/0035104 | A1* | 2/2016 | Bigioi ................ H04N 5/23254 348/208.1 |

OTHER PUBLICATIONS

Wang et al, ("Multicamera phase measuring profilometry for accurate depth measurement", SPIE vol. 6555, (2007), pp. 1-12) (Year: 2007).*

Kanade et al, (A Stereo Matching Algorithm with an Adaptive Window: Theory and Experiment, IEEE Transactions on pattern analysis and Machine intelligence, vol. 16, No. 9, Sep. 1994) (Year: 1994).*

Fukiage et al., "Hiding of Phase-Based Stereo Disparity for Ghost-Free Viewing Without Glasses," Jul. 2017 [retrieved Sep. 28, 2020], ACM Transactions on Graphics, vol. 36, No. 4, Article No. 147, pp. 147:1-147:17. Retrieved: https://dl.acm.org/doi/abs/10.1145/3072959.3073672 (Year:2017).

Bimber et al., "The Visual Computing of Projector-Camera Systems", Aug. 2008 [retrieved May 3, 2021], SIGGRAPH 08:ACM SIGGRAPH 2008 classes, Article No. 84, 25 pages. Retrieved: https://dl.acm.org/doi/abs/10.1145/1401132.1401239 (Year: 2008).

Wang et al., Multicamera Phase Measuring Profilometry for Accurate Depth Measurement, May 3, 2007 [retrieved May 3, 2021], Proc. SPI E, Sensors and Systems for Space Applications, vol. 6555, 13 pages. Retrieved: https://doi.org/10.1117/12.720068 (Year: 2007).

Kanade et al., A Stereo Matching Algorithm with an Adaptive Window: Theory and Experiment, Sept 1994 [retrieved May 3, 2021], IEEE Transactions on Pattern Analysis and Machine Intelligence, vol. 16, Issue: 9,pp. 920-932. Retrieved: https://ieexplore.ieee.org/abstracl/documen1/310690 (Year 1994).

* cited by examiner

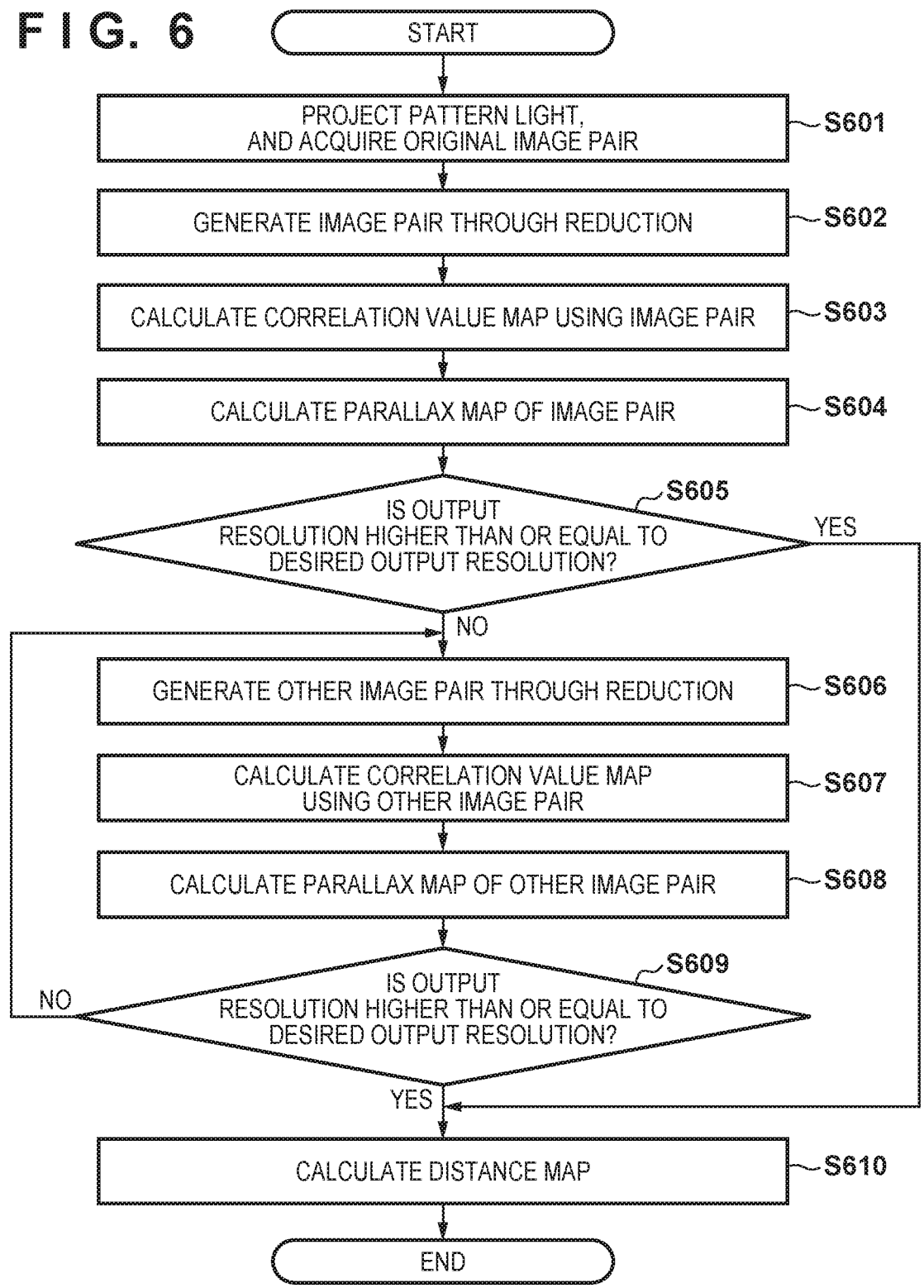

PARALLAX CALCULATION APPARATUS, PARALLAX CALCULATION METHOD, AND CONTROL PROGRAM OF PARALLAX CALCULATION APPARATUS

BACKGROUND OF THE INVENTION

Field of the Invention

The aspect of the embodiments relates to a parallax calculation apparatus, a parallax calculation method, and a control program of the parallax calculation apparatus.

Description of the Related Art

Techniques for acquiring a captured image, and calculating distance information from the acquired captured image have been proposed. For example, there is a technique for acquiring a plurality of images viewed from different viewpoints, obtaining parallax amounts from correlation values between the images, and acquiring distance information. Specifically, signals of a partial region called a search window are extracted from each image of an image pair that has a parallax. Parallax amounts are then calculated by calculating correlation values while changing the position of the search window. At this time, if there is a region in the captured image with little texture, the calculation accuracy of a correlation value decreases due to the contrast of signals being low, and the distance measurement accuracy decreases. In this regard, there is a technique for acquiring a captured image using projection of pattern light, and reducing a decrease in the distance measurement accuracy even in a region that originally has little texture.

Japanese Patent Laid-Open No. 2015-137933 proposes a technique for projecting, onto an object, pattern light having a stripe texture, and calculating parallax amounts using two images (an image pair) captured from different positions.

However, in a distance measurement technique in which projection of pattern light is used as described in Japanese Patent Laid-Open No. 2015-137933, sufficient consideration was not given to increasing the processing speed and reducing the load.

SUMMARY OF THE INVENTION

According to one aspect of the embodiments, provided is an apparatus comprising: at least one processor; a memory coupled to the at least one processor, the memory having instructions that, when executed by the at least one processor, performs operations as: an acquisition unit that captures an image of a measurement target onto which pattern light is projected, and acquires an original image pair that has a parallax; a reduction unit that reduces a size of the original image pair; and a calculator that calculates, from an image pair that is obtained by the reduction unit, a parallax map that is a distribution of parallax amounts corresponding to regions of the image pair, using predetermined search ranges and search windows in the respective regions, wherein, in order to obtain a parallax map that has a predetermined number of pieces of data, the calculator calculates parallax maps in a plurality of hierarchies, respectively, in which a hierarchy where a parallax map is calculated using an image pair obtained by the reduction unit with a lowest magnification is set as a lowest hierarchy, and the predetermined search ranges for calculating the parallax maps in the respective hierarchies are determined based on a parallax map in an immediately lower hierarchy.

Further, according to one aspect of the embodiments, provided is a method comprising: capturing an image of a measurement target onto which pattern light is projected, and acquiring an original image pair that has a parallax; reducing a size of the original image pair; and calculating, from an image pair that is obtained by the reducing, a parallax map that is a distribution of parallax amounts corresponding to regions of the image pair, using predetermined search ranges and search windows in the respective regions, wherein, in order to obtain a parallax map that has a predetermined number of pieces of data, the calculating calculates parallax maps in a plurality of hierarchies, respectively, in which a hierarchy where a parallax map is calculated using an image pair obtained by the reducing with a lowest magnification is set as a lowest hierarchy, and the predetermined search ranges for calculating the parallax maps in the respective hierarchies are determined based on a parallax map in an immediately lower hierarchy.

Furthermore, according to one aspect of the embodiments, provided is a non-transitory readable storage medium storing a computer-executable program of instructions for causing a computer to perform a method comprising: capturing an image of a measurement target onto which pattern light is projected, and acquiring an original image pair that has a parallax; reducing a size of the original image pair; and calculating, from an image pair that is obtained by the reducing, a parallax map that is a distribution of parallax amounts corresponding to regions of the image pair, using predetermined search ranges and search windows in the respective regions, wherein, in order to obtain a parallax map that has a predetermined number of pieces of data, the calculating calculates parallax maps in a plurality of hierarchies, respectively, in which a hierarchy where a parallax map is calculated using an image pair obtained by the reducing with a lowest magnification is set as a lowest hierarchy, and the predetermined search ranges for calculating the parallax maps in the respective hierarchies are determined based on a parallax map in an immediately lower hierarchy.

Further features of the disclosure will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the disclosure, and together with the description, serve to explain the principles of the disclosure.

FIG. 6 shows an example of a flow of a distance detection method according to the first embodiment.

DESCRIPTION OF THE EMBODIMENTS

Figure 1:
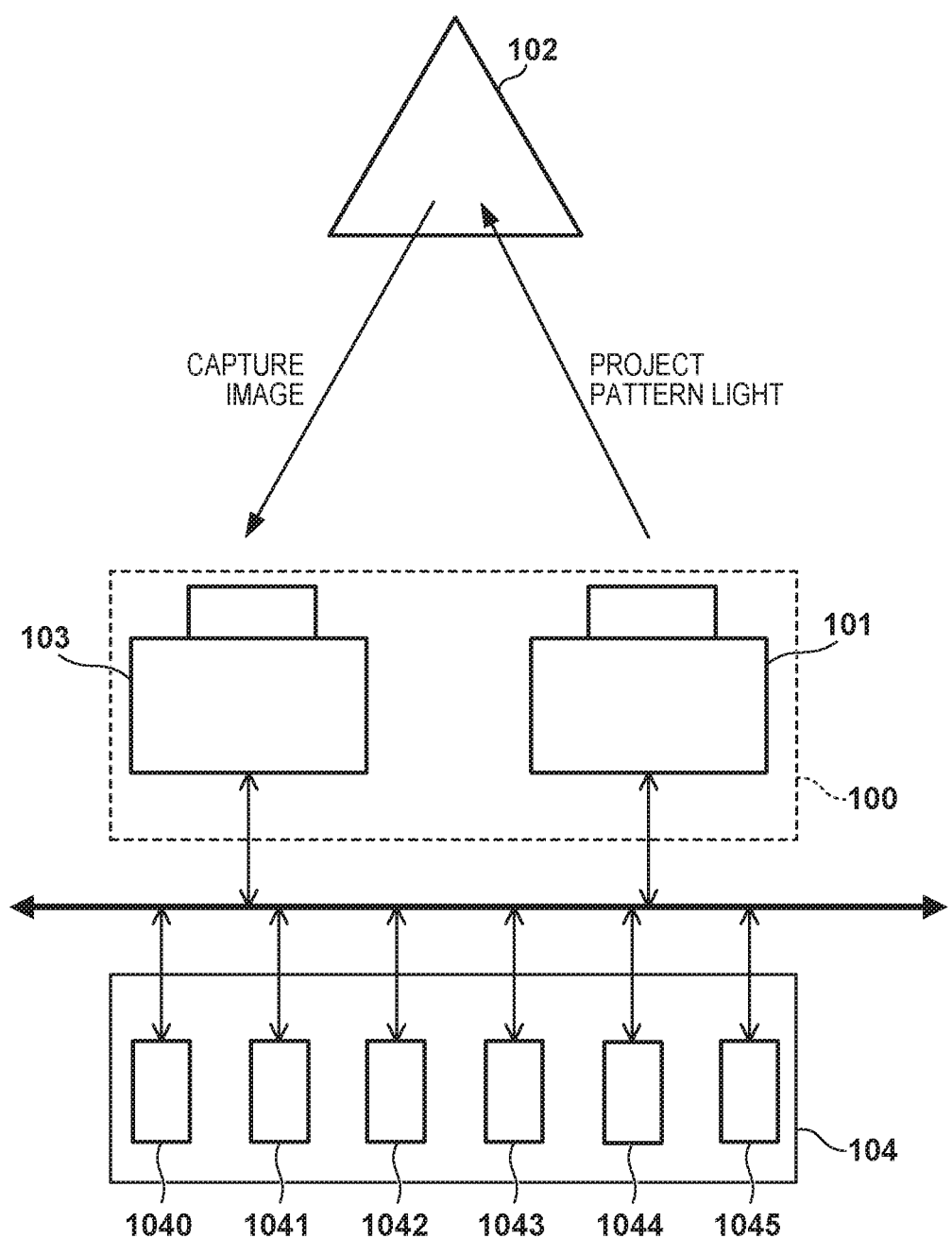
FIG. 1 is a schematic diagram showing an example of a range finder according to a first embodiment.

Exemplary embodiments of the disclosure will be described in detail with reference to the drawings. The same reference numerals are used for indicating the same constituent elements. The disclosure is not limited to the contents described in the embodiments. In addition, the embodiments may be combined as appropriate.

First Embodiment

This embodiment proposes a technique for applying hierarchical processing in order to increase the speed or reduce the load of stereo distance measurement in which pattern projection is used. In the hierarchical processing, by calculating parallax amounts using a reduced-size image generated by thinning out a captured image at a certain pixel interval, for example, the calculation load is reduced, and the speed of processing is increased. Furthermore, in calculation of parallax amounts in an initial image with a large number of pixels, the calculation load is decreased and the speed of the processing is increased by limiting a search range based on parallax amounts obtained in a lower hierarchy in the hierarchical processing.

In one embodiment, a magnification for generating a reduced-size image (the size of a reduced image) is determined in accordance with a predetermined calculation speed and predetermined calculation accuracy of distance information. In addition, in a pattern projection image captured after projecting pattern light, the magnification affects the pattern. Specifically, if a combination of a magnification and a spatial frequency of pattern projection is not suitable, the contrast S/N ratio in a texture created by the pattern decreases in images of a generated image pair. Accordingly, the parallax calculation accuracy, in other words, the distance measurement accuracy, decreases. In view of this, this embodiment suggests various conditions for reducing the processing load using hierarchical processing, and for further suppressing a decrease in the distance measurement accuracy (the calculation accuracy of parallax amounts and phase differences), in stereo distance measurement in which pattern projection is used.

Apparatus Configuration and Pattern Image Capturing Unit

FIG. 1 shows a range finder as an example of a parallax calculation apparatus that has a pattern image capturing unit 100 that acquires an original image pair by projecting pattern light onto a distance measurement target and capturing an image. The pattern image capturing unit 100 includes a projection apparatus 101 that projects pattern light and an image capturing apparatus 103 that captures an original image pair that has a parallax. The projection apparatus 101 projects pattern light onto a subject 102 that is a measurement target. The image capturing apparatus 103 then captures an original image pair. In addition, the projection apparatus 101 and the image capturing apparatus 103 are connected to a calculation device 104 that performs control of synchronization and the like, and calculates parallax amounts from an image pair obtained by reducing an original image pair. In this embodiment, the calculation device 104 and the pattern image capturing unit 100 that has the projection apparatus 101 and the image capturing apparatus 103 are provided as separate apparatuses, but may be integrated. In addition, a configuration may be adopted in which the projection apparatus 101 and the calculation device 104 are integrated and the image capturing apparatus 103 is a separate apparatus, and the apparatus configuration is not limited to the above-described configurations. In a case where the image capturing apparatus 103 and the calculation device 104 are integrated, an arithmetic processing unit 204 of the image capturing apparatus 103 shown in FIG. 2 may have the configuration/function of the calculation device 104.

The calculation device 104 has a resizing unit 1040, a correlation calculation unit 1041, a parallax amount calculation unit 1042, a distance calculation unit 1043, a memory 1044, and a control unit 1045. The resizing unit 1040 reduces, by a predetermined magnification, an original image pair that has been input by the image capturing apparatus 103, and has a parallax, and outputs the reduced image pair to the correlation calculation unit 1041. The correlation calculation unit 1041 calculates a correlation value map of the image pair using, for example, a SAD (Sum of Absolute Difference) while relatively moving the image pair that has been input from the resizing unit 1040, and has a parallax. The parallax amount calculation unit 1042 determines, for example, a correlation value at which the correlation is highest, from the correlation value map obtained by the correlation calculation unit 1041, and calculates parallax amounts (image shift amounts) of the image pair. The distance calculation unit 1043 converts the parallax amounts (image shift amounts) obtained by the parallax amount calculation unit 1042, into a defocus amount using a conversion coefficient corresponding to the current state of the optical system, and further calculates a subject distance, which is a distance to the subject. Based on an original image (signal) pairs that are sequentially input from the image capturing apparatus 103 or an original image pair temporarily stored in the memory 1044, at least parallax amounts, defocus amounts, or distances to the subject are stored in the memory 1044, or are output to the outside, as a calculation result by the calculation device 104. In this embodiment, the above-mentioned parallax amounts, defocus amounts, and distances to the subject are collectively referred to as depth information, which is information corresponding to an image and indicating the position in the depth direction of the subject in the image or the positional relationship thereof. The control unit 1045 sends an instruction to constituent elements in the calculation device 104 so as to control the constituent elements.

Figure 2:
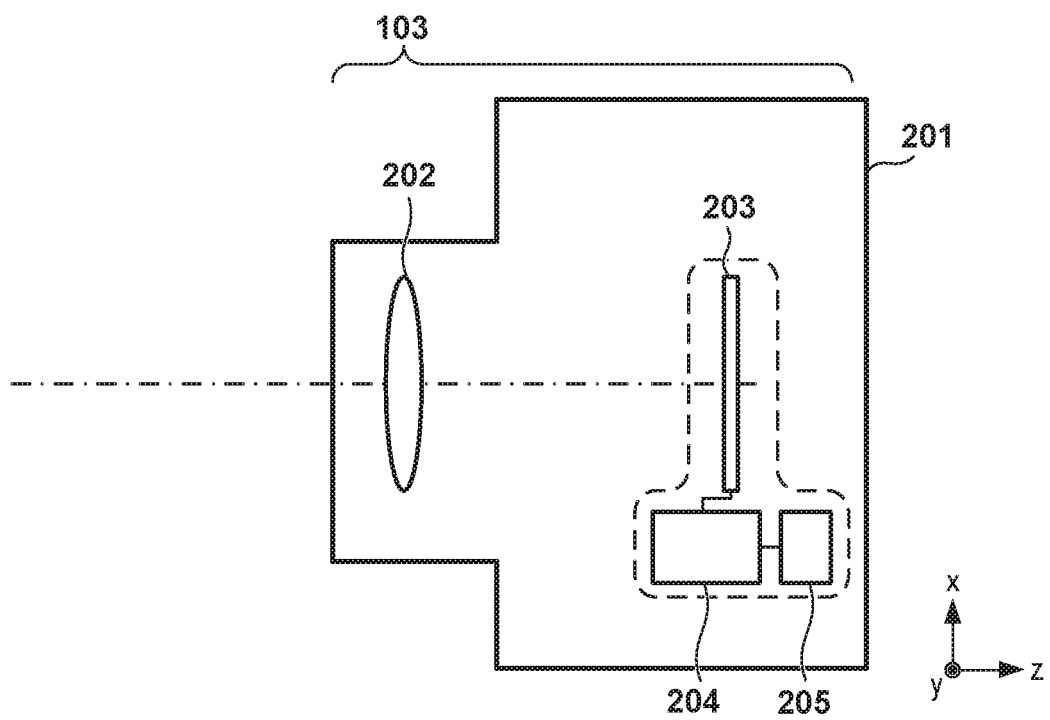
FIG. 2 is a schematic diagram showing an example of an image capturing apparatus according to the first embodiment.
Figure 3A:
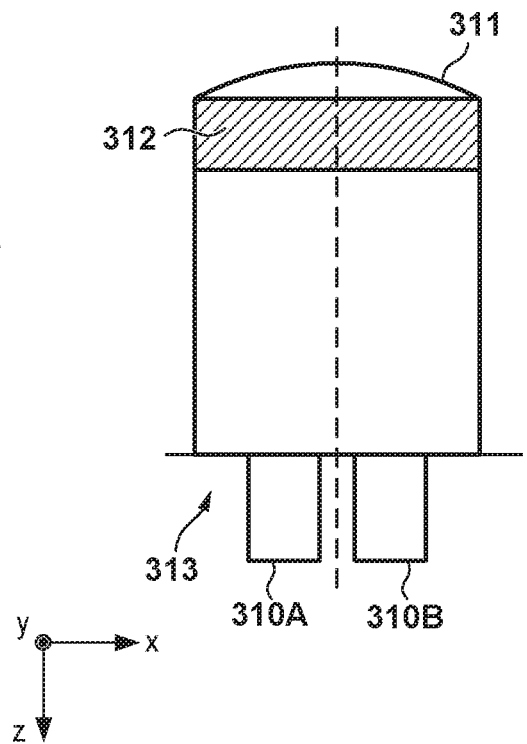
FIG. 3A is a cross-sectional diagram showing an example of a pixel according to the first embodiment.

FIG. 2 shows the configuration of the image capturing apparatus 103. The image capturing apparatus 103 has a camera body 201, an imaging lens 202, an image sensor 203, the arithmetic processing unit 204, and a main body memory 205. In this embodiment, each of the pixels of the image sensor 203 are divided in at least one direction such that the image capturing apparatus 103 can acquire an original image pair. As shown in the cross-sectional diagram shown in FIG. 3A, a pixel of the image sensor 203 has a microlens 311, a filter 312, and photoelectric conversion portions 310A and 310B. The image sensor 203 has, for each pixel, a spectrum property corresponding to a wavelength band to be detected using the filter 312, and is arranged with a predetermined color arrangement pattern (a Bayer array realized by using an RGB (Red, Green, and Blue) color filter, for example), on an xy plane. The photoelectric conversion portions 310A and 310B that have sensitivity to light in a wavelength band to be detected are provided on a substrate 313. The wavelength band to be detected is not limited to visible light, but a wavelength band in which at least some photoelectric conversion portions can receive light with high sensitivity includes a wavelength band of light that is emitted by the projection apparatus 101. In addition, each pixel has interconnect (not illustrated).

Figure 3B:
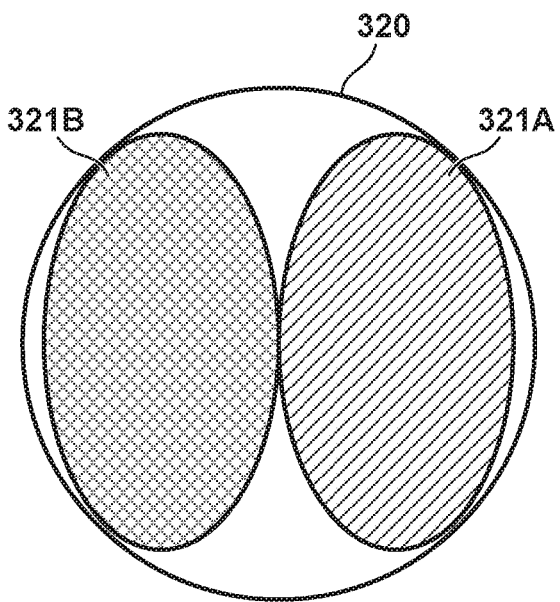
FIG. 3B is a schematic diagram showing an exit pupil according to the first embodiment.

A first pupil region 321A and a second pupil region 321B shown in FIG. 3B are different regions in an exit pupil 320 of the imaging lens 202. A first light flux that has passed through the first pupil region 321A is incident on the photoelectric conversion portion 310A, and a second light flux that has passed through the second pupil region 321B is incident on the photoelectric conversion portion 310B. A first signal is acquired from the first light flux acquired by the photoelectric conversion portion 310A that is a first pixel in the image sensor 203. Similarly, a second signal is acquired from the second light flux acquired by the photoelectric conversion portion 310B that is a second pixel. The arithmetic processing unit 204 (FIG. 2) then forms an A image from first signals, and forms a B image from second signals. The formed A image and B image are stored in the main body memory 205, and the calculation device 104 (FIG. 1) performs distance measurement calculation processing using the A image and the B image so as to calculate a parallax map and a distance map.

The distance measurement calculation processing is performed using a known technique, and, for example, the calculation device 104 calculates a correlation value map, obtains a parallax map from the correlation value map, and converts the parallax map into a distance map. The projection apparatus 101 projects pattern light onto the subject 102, and the image capturing apparatus 103 captures an image in a state where the texture is superimposed on the surface of the subject 102. Accordingly, the accuracy of calculation of a correlation value peak, and therefore, the accuracy of distance measurement calculation improves.

Figure 4:
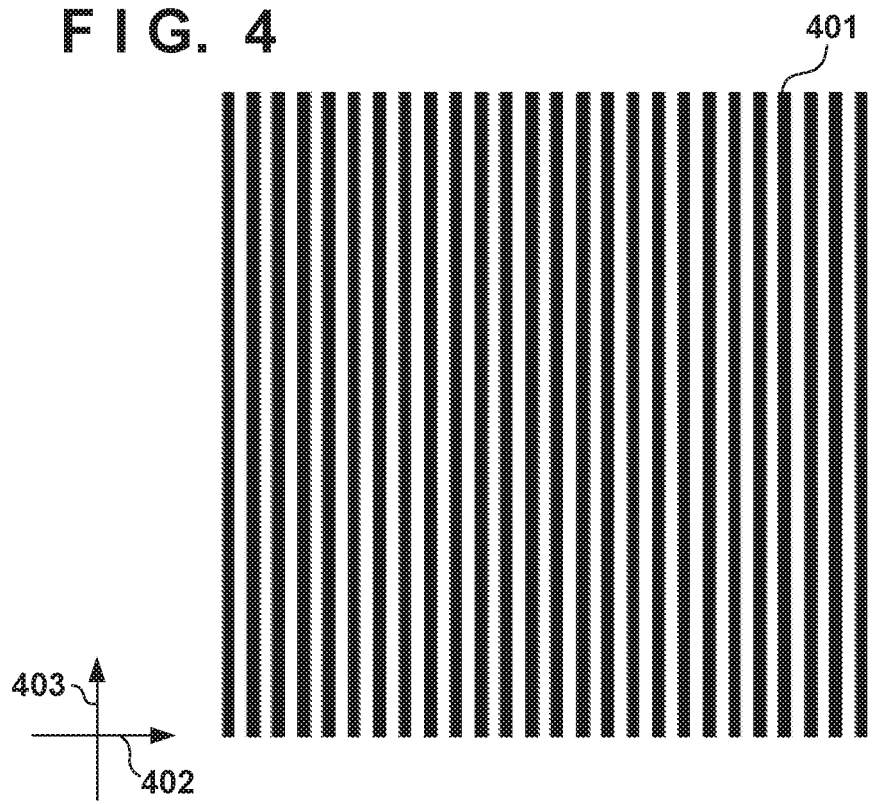
FIG. 4 shows an example of a projection pattern according to the first embodiment.

FIG. 4 shows a pattern 401 of pattern light that is projected. This pattern 401 is not limited, but the pattern 401 having a cycle that is fixed in a parallax splitting direction 402 is desirable in order to easily control the spatial frequency of a pattern in an acquired original image pair. In addition, there are few constraints on a direction 403 perpendicular to the parallax splitting direction 402. Note that since smoothing of acquired original image pairs and correlation values is made easy, a similar repetitive pattern, namely a vertical stripe pattern having a cycle that is fixed in the parallax splitting direction 402, such as the pattern 401, is desirable.

Figure 5:
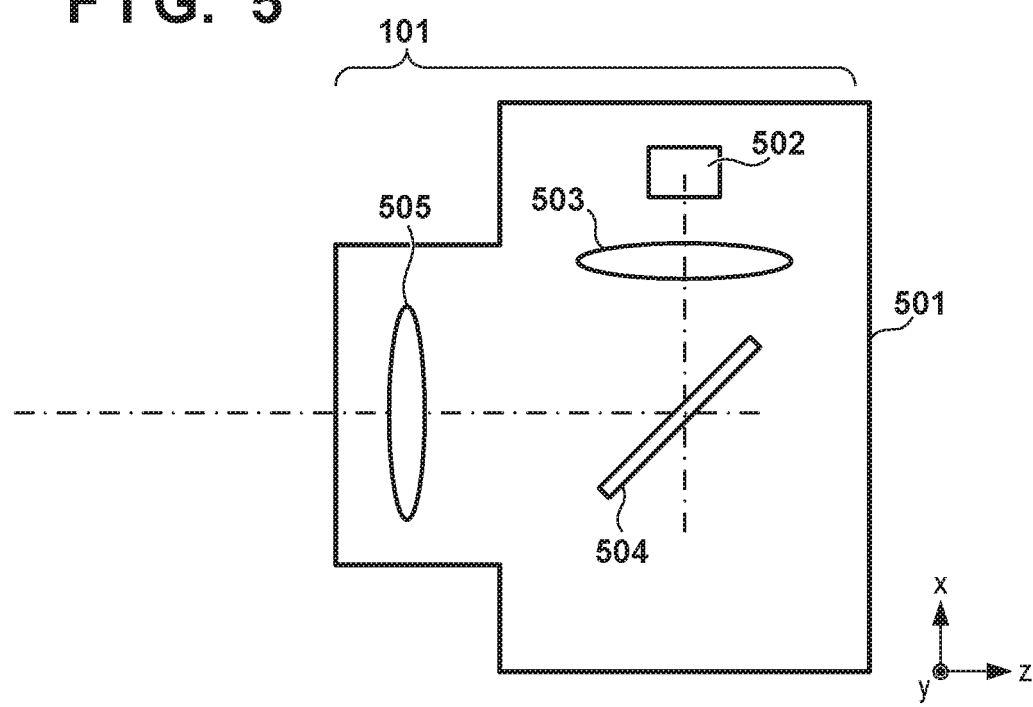
FIG. 5 shows an example of a projection apparatus according to the first embodiment.

The projection apparatus 101 shown in FIG. 5 has a body 501, a light source 502, an adjustment lens 503, a spatial modulator 504, and a projection lens 505. The light source 502 has a white LED, and light emitted from the light source 502 is appropriately converged through the adjustment lens 503 onto the spatial modulator 504. After that, the spatial modulator 504 forms pattern light, and the pattern light is projected on the surface of the subject 102 by the projection lens 505. The spatial modulator 504 is constituted by a DMD (Digital Mirror Device). The projection apparatus 101 is not limited to this configuration. The light amount distribution may be made uniform by installing a diffusion plate, or Koehler illumination or various projection optical systems such as an optical system that allow a light source image to be formed in an entrance pupil may be applied.

Basic Processing Flow and Hierarchical Processing

A basic processing flow for acquiring an original image pair and calculating a distance map and hierarchical processing in which reduced image pairs are used will be described. In this embodiment, processing using an image pair acquired by reducing an original image pair at the smallest magnification through a reducing process in order to obtain a parallax map that has a predetermined number of pieces of data is the processing of the lowest hierarchy. In one embodiment, the magnification for generating a reduced-size image of the lowest hierarchy is set to a magnification that makes it possible to prevent a decrease in the distance measurement accuracy. Note that the magnification of a reduced-size image of the lowest hierarchy will be described later in detail. In a plurality of hierarchies in which the magnification for an image pair increases (the reduction rate decreases) stepwise, parallax maps are calculated sequentially. At this time, by determining a search range or a search window in each hierarchy within a limited range or a limited magnitude based on a parallax map in the immediately lower hierarchy, the processing load required for calculating a parallax map is reduced by a large amount, and the processing speed required for calculating a parallax map is increased by a large amount.

FIG. 6 shows a basic processing flow according to the first embodiment. In step S601, the projection apparatus 101 projects pattern light onto the subject 102, and the image capturing apparatus 103 acquires an original image pair of the subject 102 on which the pattern light is projected. In step S602, the resizing unit 1040 of the calculation device 104 reduces the original image pair by a magnification m, and generates an image pair of reduced-size images of the lowest hierarchy. Here, the magnification m corresponds to the ratio of the number of pixels that are read out when forming an image pair. Therefore, the magnification m for a reduced-size image that is generated by thinning out the original image pair acquired in step S601 by outputting every a-th pixel from among the pixels of the original image pair can be represented as Expression (1) below.

$$m = 1/a \quad (1)$$

Therefore, by outputting every a-th pixel from among the pixels of the original image pair acquired in step S601, a reduced-size image resulting from reducing the original image pair at the magnification m can be obtained.

Next, using the image pair obtained by reducing the original image pair at the magnification m in step S603, a correlation value map (distribution of correlation values corresponding to regions of the image pair) is calculated by a known calculation technique that has been described above. At this time, the correlation value map is calculated using the image pair acquired by reducing an original image pair by thinning out the number of pixels, and thus, compared with a conventional case of calculating a correlation value map from an original image pair, the in-plane resolution (the number of samplings, the number of pieces of data) is decreased. On the other hand, the number of pixels in a search range for a correlation value map and the number of pixels in a search window used for calculation are smaller compared with a case of calculation using an original image pair, and thus the calculation speed is increased. In step S604, a parallax map between the A image and the B image of the image pair is calculated from the obtained correlation value map.

In step S605, it is determined whether or not the output resolution of the parallax map is higher than or equal to a desired output resolution (number of pieces of data, number of pixels), and if the output resolution is not higher than or equal to the desired output resolution (NO in step S605), the procedure advances to step S606. Note that any desired output resolution can be set, and the setting method is not particularly limited. If the desired output resolution is not obtained, the calculation device 104 calculates a parallax map from another image pair obtained by reducing the original image pair at a higher magnification. Specifically, in step S606, in accordance with the desired output resolution for calculating a distance map, another image pair that is generated by thinning out the number of pixels of the original image pair by outputting every b-th pixel (b is smaller than a) is generated, and the generated image pair is used in the correlation calculation for an immediately higher hierarchy (a>b). Therefore, the magnification for the other image pair is higher than the magnification for an earlier generated image pair, and the other image pair is an image pair that is enlarged compared to an earlier generated image pair.

Next, in step S607, a search range to be used in the correlation calculation for the immediately higher hierarchy is set based on the parallax map obtained earlier in step S604, and a correlation value map is calculated using another image pair generated in step S606. In this embodiment, on the basis of the parallax amount previously obtained in the corresponding region, the search range, namely the pixel shift amount (for example, ±10 pixels in a given hierarchy) for relatively shifting the pixels of the image pair in the correlation calculation, is set to a value of the parallax amount or a value in the vicinity thereof. In addition, the search window size (for example, 4 rows in the vertical direction and 20 pixels in the horizontal direction in a given hierarchy) which is the size of the region to be subjected to the correlation calculation in the image pair is determined on the basis of the magnification (a, b, etc.) or the resolution of each hierarchy. In other words, the size (resolution, number of pixels) of the search window is set so that the target areas (target subject) of the correlation calculation in different hierarchies becomes substantially the same. Furthermore, according to the reliability of the correlation value previously obtained in the lower hierarchy, by assuming that, in the region with high reliability, reliability of the calculated parallax amount is also high (there is no need to increase the size to absorb the calculation error), the search window size may be set smaller than the size converted from the magnification. The reliability of the correlation value here includes the inclination in the curve plotting the image shift amounts and the correlation values obtained by the correlation calculation, and edge integral values in the target area of the image pairs in order to measure whether the image signals has a large edge component with which correlation is easily taken. Accordingly, compared with a case of setting a uniformly large search range and search window in the entire image, it is possible to largely reduce the processing load and largely increase the processing speed required for calculating a parallax amount.

After that, in step S608, a parallax map (distribution of parallax amounts corresponding to the regions of the image pair) is calculated. In this manner, the parallax map of the image pair obtained in step S604 is reflected in settings of a search range and a search window in another image pair in the next hierarchy, and thus the search range and the search window are not set to be unnecessarily large. Accordingly, the calculation speed is improved compared with a case where calculation from an image pair acquired through reduction is not involved. In step S609, whether or not the output resolution of the parallax map is higher than or equal to the desired output resolution is determined, and if the output resolution of the parallax map is not higher than or equal to the desired output resolution (NO in step S609), steps S606 to S608 are repeated until the output resolution is higher than or equal to the desired output resolution. In other words, an image pair for which the magnification is higher than the other image pair is generated by reducing the original image pair, a correlation value map is calculated using the new image pair that has been generated, and then, a parallax map is calculated.

If a parallax map whose output resolution is higher than or equal to the desired output resolution is obtained (YES in step S609), a distance map (distribution of distance values corresponding to regions of image pair) is calculated from the parallax map based on optical system information of the camera, in step S610. If the resolution of an image pair (image pair that is generated by thinning out the pixels to every a-th pixel) generated using the magnification m is higher than or equal to the desired output resolution (YES in step S605), a distance map is calculated using the parallax map of this image pair. In this case, the procedure does not advance to step S606, and the procedure advances to step S610, and a distance map is calculated.

Variable Determination Method and Relationship between Magnification m and Spatial Frequency f Subsequently, the relationship between the magnification m at which an original image pair is reduced and a spatial frequency f in the original image captured after pattern light is projected, in the hierarchy processing for the lowest hierarchy performed in step S602 for reducing an original image pair to the minimum, in calculation of a parallax map according to the first embodiment, will be described.

Figure 7A:
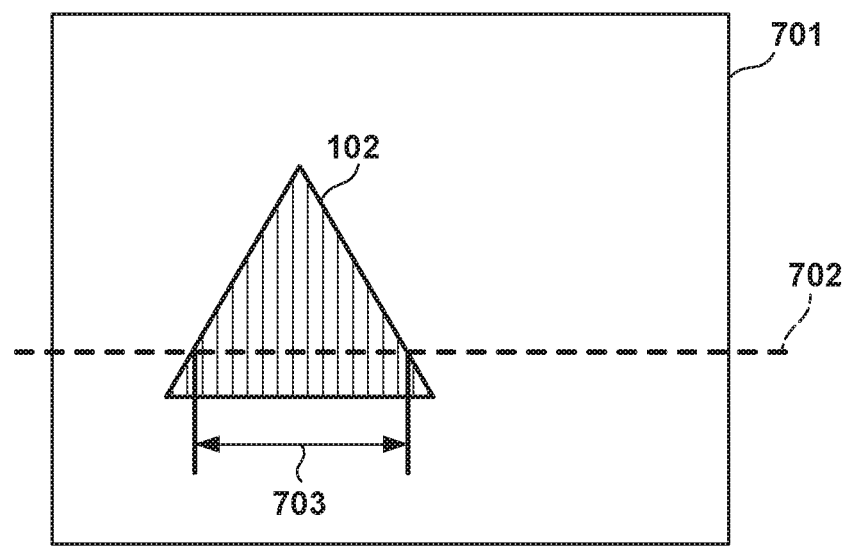
FIG. 7A is a schematic diagram showing an example of an image captured after pattern light is projected.
Figure 7B:
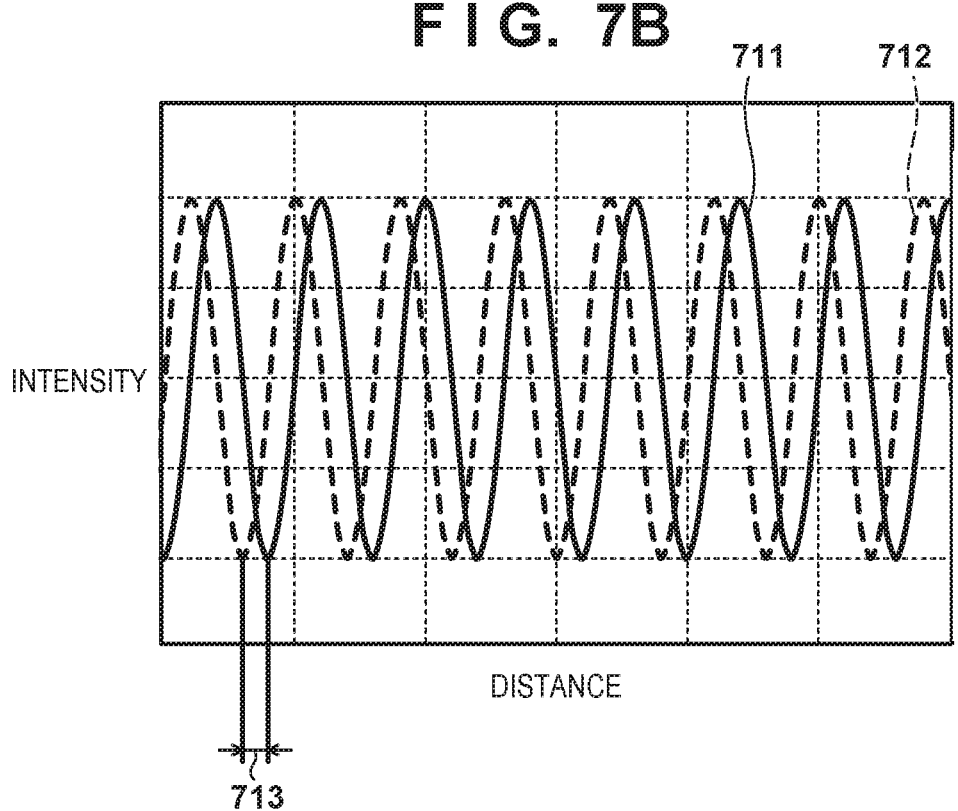
FIG. 7B shows an example of a graph showing the amplitudes and cycles of a signal of a first pixel and a signal of a second pixel.

FIG. 7A shows an original image 701 acquired through image capturing after projecting the pattern 401 onto the subject 102 with the configuration shown in FIG. 1. Here, for ease of description, image signals in a section 703 corresponding to the subject 102 on which pattern light is projected, on a line segment 702 in the original image 701 (one image in the original image pair), are extracted and shown in FIG. 7B. The image signals in the section 703 include first signals 711 (solid lines) and second signals 712 (broken lines) corresponding to a fixed cycle of the pattern 401. Here, the first signals 711 are signals of an A image acquired by the photoelectric conversion portions 310A that are first pixels. In addition, the second signals 712 are signals of a B image acquired by the photoelectric conversion portions 310B that are second pixels. The first signals 711 and the second signals 712 have a phase shift 713 from each other, which corresponds to a parallax amount.

Figure 8A:
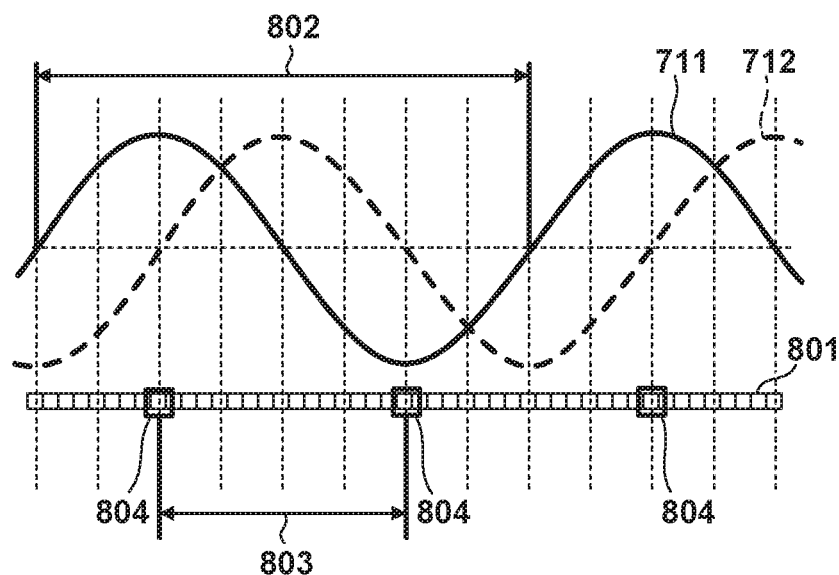
FIG. 8A shows an example of a graph showing a spatial frequency and sampling pixels.
Figure 8B:
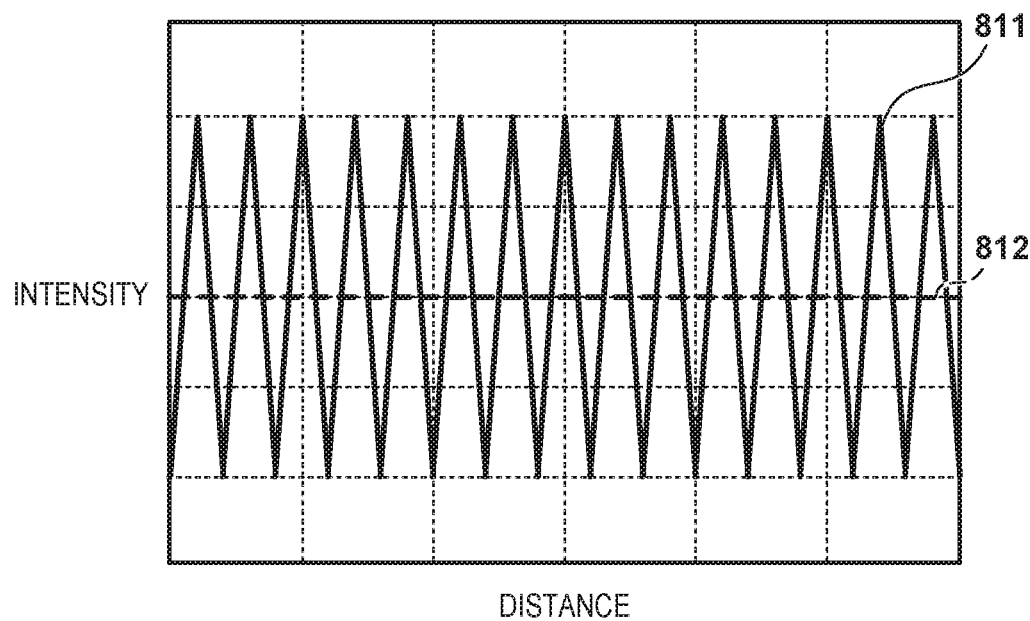
FIG. 8B shows an example of a graph showing sampled signals acquired through reduction by a magnification m1.

The relationship between the magnification m and a reference frequency f (hereinafter, also referred to as the spatial frequency f) that is a pattern spatial frequency on a measurement target in an acquired original image pair will be described with reference to FIGS. 8A and 8B. FIG. 8A shows a partial section of the first signals 711 and the second signals 712 shown in FIG. 7B, and one-dimensionally shows the relationship with captured pixels 801. The first signals 711 have the reference frequency f (=1/T) corresponding to a cycle T indicated by a section 802 on the acquired original image (the same applies to the second signal 712). On the other hand, FIG. 8B shows image signals of an image pair generated using only sampling pixels 804 that are acquired by thinning out the original image pair to every a1-th pixel corresponding to a section 803, and are indicated by thick frames in FIG. 8A, in other words, by reducing the original image pair by performing sampling at a magnification m1 (=1/a1).

Image signals of an image acquired by reducing the first signals 711 by performing sampling at the magnification m1 are signals 811 indicated by solid lines. In addition, image signals of an image acquired by reducing the second signals 712 by performing sampling at the magnification m1 are signals 812 indicated by a broken line. At this time, the sampling pixels 804 are set with a relationship of m1=2f so as to satisfy a sampling theorem. As shown in FIG. 8B, the initial signal shape of the signals 811 corresponding to the first signals 711 is maintained, but the initial signal shape of the signals 812 corresponding to the second signals 712 is lost.

This is because the first signals 711 and the second signals 712 have phase differences due to parallax amounts, and thus, if the sampling theorem is applied to one type of signal, the shape of the other type of signal is not maintained or restored. In this manner, if an appropriate magnification is not set for an original image pair acquired after pattern light is projected onto the subject 102, the contrast of the signal shape (texture) of an A image or a B image of an image pair formed by reducing the original image pair decreases. As a result, the calculation accuracy of a correlation value map decreases, and thus the calculation accuracy of a parallax map and the calculation accuracy of a distance map decrease.

Figure 9A:
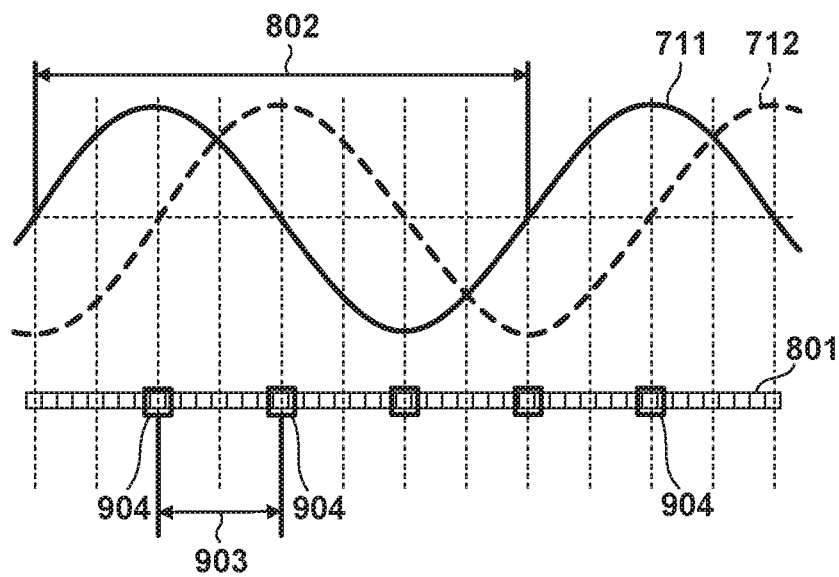
FIG. 9A shows an example of a graph showing a spatial frequency and sampling pixels.
Figure 9B:
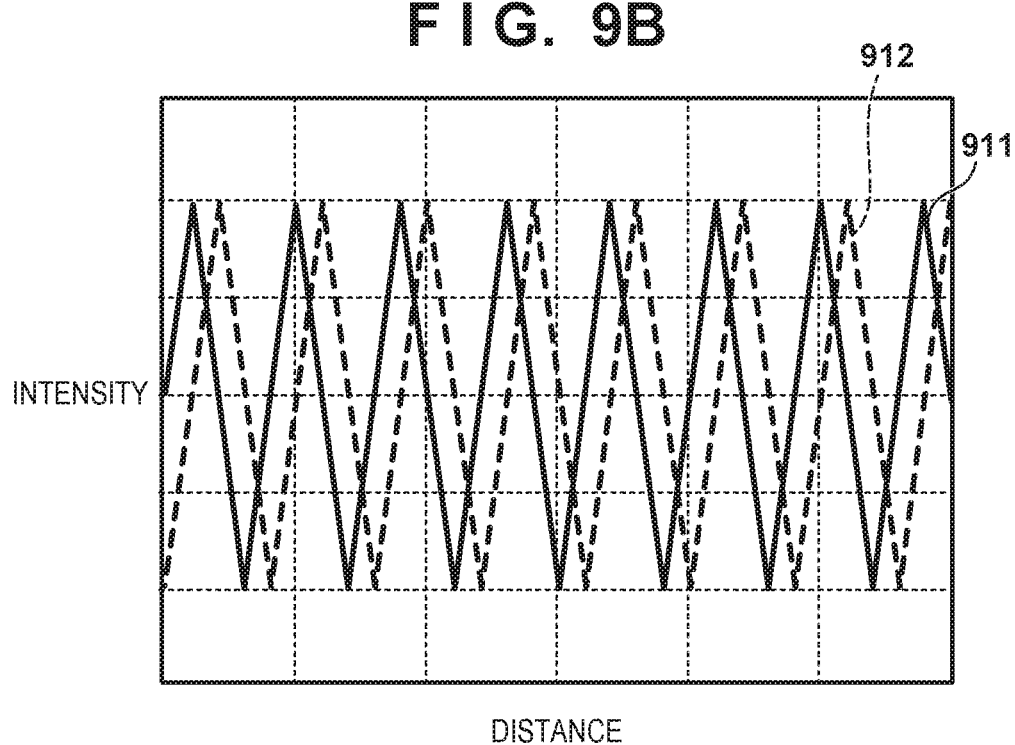
FIG. 9B shows an example of a graph showing sampled signals acquired through reduction by a magnification m2.

When the phase difference between signal pair is ±π/4, minimum sampling through which the shape of one of the signal pairs is maintained to the maximum extent causes the shape of the other of the signal pair to be lost most. Therefore, if a magnification is (sampling pixels are) set to satisfy a relationship of m≥4f, sampling can be performed with a minimum number of pixels while maintaining the signal shapes of both the A signals and the B signals. FIGS. 9A and 9B show a state where sampling is performed with this minimum number of pixels.

In FIG. 9A, similar to FIG. 8A, the first signals 711 have, on the acquired original image, the spatial frequency f (=1/T) corresponding to the cycle T indicated by the section 802 (the same applies to the second signals 712). Based on this, FIG. 9B shows image signals of an image generated using only sampling pixels 904 that are acquired by thinning out the original image pair to every a2-th pixel corresponding to a section 903, and are indicated by thick frames in FIG. 9A, in other words, by reducing the original image pair by performing sampling at the magnification m2 (=1/a2). Image signals of an image acquired by reducing the first signals 711 by performing sampling at the magnification m2 are signals 911 indicated by solid lines. In addition, image signals of an image acquired by reducing the second signals 712 by performing sampling at the magnification m2 are signals 912 indicated by broken lines. Here, the relationship between the magnification m2 and the spatial frequency f is m2=4f. At this time, also in the image pair formed by reducing the original image pair, the initial signal shapes of image signals are reflected in both the signals 911 corresponding to the A image and the signals 912 corresponding to the B image. Therefore, a parallax map can be calculated without a decrease in the calculation accuracy of a correlation value map. In addition, in order to obtain the effect of the first embodiment, it suffices for the relationship between the magnification m that depends on the interval of sampling pixels and the spatial frequency f to satisfy Expression (2) below.

$$m \geq 4f \quad (2)$$

However, Expression (2) above is true regardless of the value of the magnification m if the spatial frequency f is reduced infinitely, in other words if the cycle T of the pattern 401 of the pattern light that is projected is increased infinitely. On the other hand, regarding the subject 102 that is a target for distance map calculation, the cycle T that is unnecessarily large is not suitable from the viewpoint of the in-plane resolution according to which a distance map is calculated. Therefore, the pattern image capturing unit 100 that has the projection apparatus 101 and the image capturing apparatus 103 controls the spatial frequency f on an acquired original image pair, relative to the magnification m, to satisfy a relationship of the magnification m=4f. Here, the magnification m is determined in accordance with a predetermined spatial resolution and calculation speed, and the spatial frequency f is a spatial frequency of pattern light on an acquired image pair, from which the maximum in-plane resolution is acquired. The spatial frequency f may be calculated through pattern detection, in image pairs that are sequentially acquired, and if the optical conditions of the projection apparatus 101 and the image capturing apparatus 103, the positional relationship with the subject, and the like are known in advance, corresponding spatial frequencies f may be stored in advance in the memory 1044.

Here, the setting accuracy of the spatial frequency f will be described. An error superimposed by the optical systems of the projection apparatus 101 and the image capturing apparatus 103 of the pattern image capturing unit 100, and an error caused by relative distances between apparatuses including the subject 102 are superimposed. Accordingly, the spatial frequency f on an acquired original image includes an error of ±25%. Therefore, it suffices for the relationship between the magnification m and the reference frequency f to satisfy Expression (3) below.

$$5f \geq m \geq 3f \quad (3)$$

If the relationship between the reference frequency f that is a spatial frequency of the pattern 401 of the subject 102 in an acquired image and the magnification m that depends on the number of thinned-out pixels satisfies Expression (3), a correlation value map can be calculated from an image pair formed by reducing the original image pair while maintaining the calculation accuracy of a parallax map. Accordingly, an effect of setting the magnification m that satisfies the predetermined calculation speed and resolution, without a decrease in the distance measurement accuracy is acquired. For example, the calculation device 104 sets a projection pattern or an image capturing condition to satisfy Expression (3) above. Specifically, the calculation device 104 sets a generation pattern or pattern mask of the spatial modulator 504 in the projection apparatus 101, or the magnification of the projection lens 505, and a field angle or a magnification of an image that is acquired by the image capturing apparatus 103. In addition, the calculation device 104 sets the magnification m of the hierarchical processing to satisfy Expression (3) above.

Other Configurations

Figure 10:
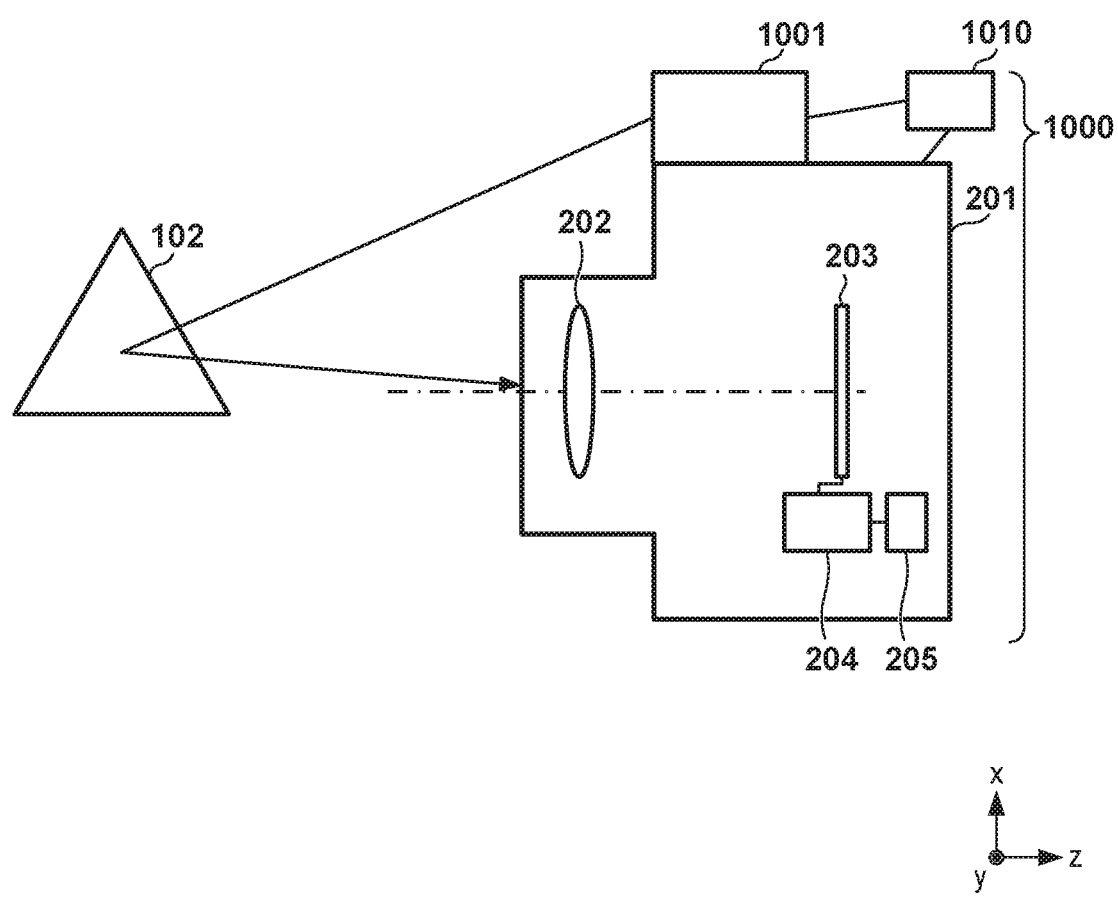
FIG. 10 is a schematic diagram showing another example of an image capturing apparatus according to the first embodiment.

The image capturing apparatus 103 that acquires an original image pair may be a stereo camera that has a plurality of, namely two or more optical systems and image sensors corresponding to the optical systems. By using a stereo camera, the degree of freedom in designing the base line length is improved, and the distance measurement resolution improves. In addition, the pattern image capturing unit 100 according to the first embodiment may be an apparatus in which the image capturing apparatus 103 is equipped with the projection apparatus 101. This apparatus is in a state where the positional relationship between the image capturing apparatus 103 and the projection apparatus 101 is fixed, and thus it is possible to realize improvement of environmental resistance and easy setting of a field angle or magnification condition. Specifically, as shown in FIG. 10, the image capturing apparatus according to the first embodiment may be an image capturing apparatus 1000 in which a projection apparatus 1001 is mounted on a camera body 201, and a control apparatus 1010 controls parameters and synchronization between these apparatuses.

By using, as the calculation device 104, a CPU (Central Processing Unit) provided in the image capturing apparatus 1000, it is possible to reduce the size of the image capturing apparatus 1000. The spatial modulator 504 that is a pattern control unit may be constituted by any of a reflective LCOS (Liquid Crystal on Silicon), a transmissive LCOS, and a DMD (Digital Micromirror Device). By using one of these spatial modulators 504, a pattern having a large number of pixels can be generated at a high response speed. Accordingly, the in-plane resolution can be improved, patterns can be switched at a high speed, and it is possible to increase the speed at which an image is acquired.

The pattern control unit may project a pattern by inserting/taking out a pattern mask made of a frosted glass, a metal plate, or the like, in which a pattern is formed in advance, into/from a light path of the projection apparatus 101 or 1001. Accordingly, it is possible to realize a reduction in the cost and size of the apparatus. Furthermore, light sources in the projection apparatus 101 or 1001 may be any of an LD (Laser Diode), an LED (Light Emitting Diode), and any heat light source such as a halogen lamp. By designing an appropriate light amount and size of the light source in consideration of the sizes of the apparatus and the subject, it is possible to realize a reduction in the size and cost of the apparatus.

The light sources of the projection apparatuses 101 and 1001 can emit white light whose wavelength includes the entire visible light range. Accordingly, in the technique in the first embodiment, the effect of the first embodiment is obtained regardless of the spectrum reflectance of the subject. In addition, the light sources of the projection apparatuses 101 and 1001 may emit light of three colors, namely R, G, and B. Accordingly, it is possible to match the color filter transmission band of the image capturing apparatus and the light wavelength, and increase the light utilization efficiency for the used energy.

In addition, an image of a subject may be captured by an image capturing apparatus in which the wavelength of light source of the projection apparatus 101 or 1001 corresponds to an IR (infrared) band, and that has an image sensor in which a color filter having a transmission band and light-receiving sensitivity that correspond to the IR band is arranged. Accordingly, an image that is to be viewed, and in which an RGB band is used can be captured at the same time as distance measurement is performed. Particularly when the IR wavelength band is 800 to 1100 nm, Si can be used for the photoelectric conversion portions. Accordingly, by changing the array of the color filter, an image that is to be viewed, and in which an RGB band is used and a distance measurement image in which an IR band is used can be acquired using one image sensor.

A reduced-size image may be generated by adding and averaging pixel values by the number of pixels equivalent to a thinning out rate. Accordingly, identification performance of a pattern and a texture related to the distance measurement accuracy is degraded, but the environmental resistance improves through smoothing. Any of an SSD (Sum of Squared Difference), an SAD (Sum of Absolute Difference), and a POC (Phase Only Correlation) may be used as a technique for calculating a correlation value map, but there is no limitation to these techniques.

The first embodiment includes a computer program in addition to the image capturing apparatus. The computer program of the first embodiment causes a computer to execute predetermined processes in order to calculate a distance map or a parallax map. The program of the first embodiment is installed on a computer of a distance detection apparatus, a parallax amount detection apparatus, or an image capturing apparatus such as a digital camera that has one of the distance detection apparatus and the parallax amount detection apparatus. The above-described functions are realized by the installed program being executed by a computer, and a distance map and a parallax map can be detected accurately at high-speed. As an example, this program is a control program of the image capturing apparatus 1000 that has the pattern image capturing unit 100 that acquires an original image pair and the calculation device 104 that calculates a parallax map from an image pair obtained by reducing the original image pair. The control program causes a computer to execute the calculation step and the setting step. In this calculation step, a parallax map is calculated from an image pair obtained by reducing an original image pair. In addition, in the setting step, the condition of one of the pattern image capturing unit 100 and the calculation device 104 is set such that the relationship between the magnification m that is a magnification when reducing an original image pair and the reference frequency f on the original image satisfies Expression (3) above.

Second Embodiment

High-Speed Measurement Mode, FA Inspection Apparatus

An FA (Factory Automation) inspection apparatus in which an image capturing apparatus 1100 is used and a speed setting mode according to a second embodiment will be described with reference to FIGS. 11 to 13.

Figure 11:
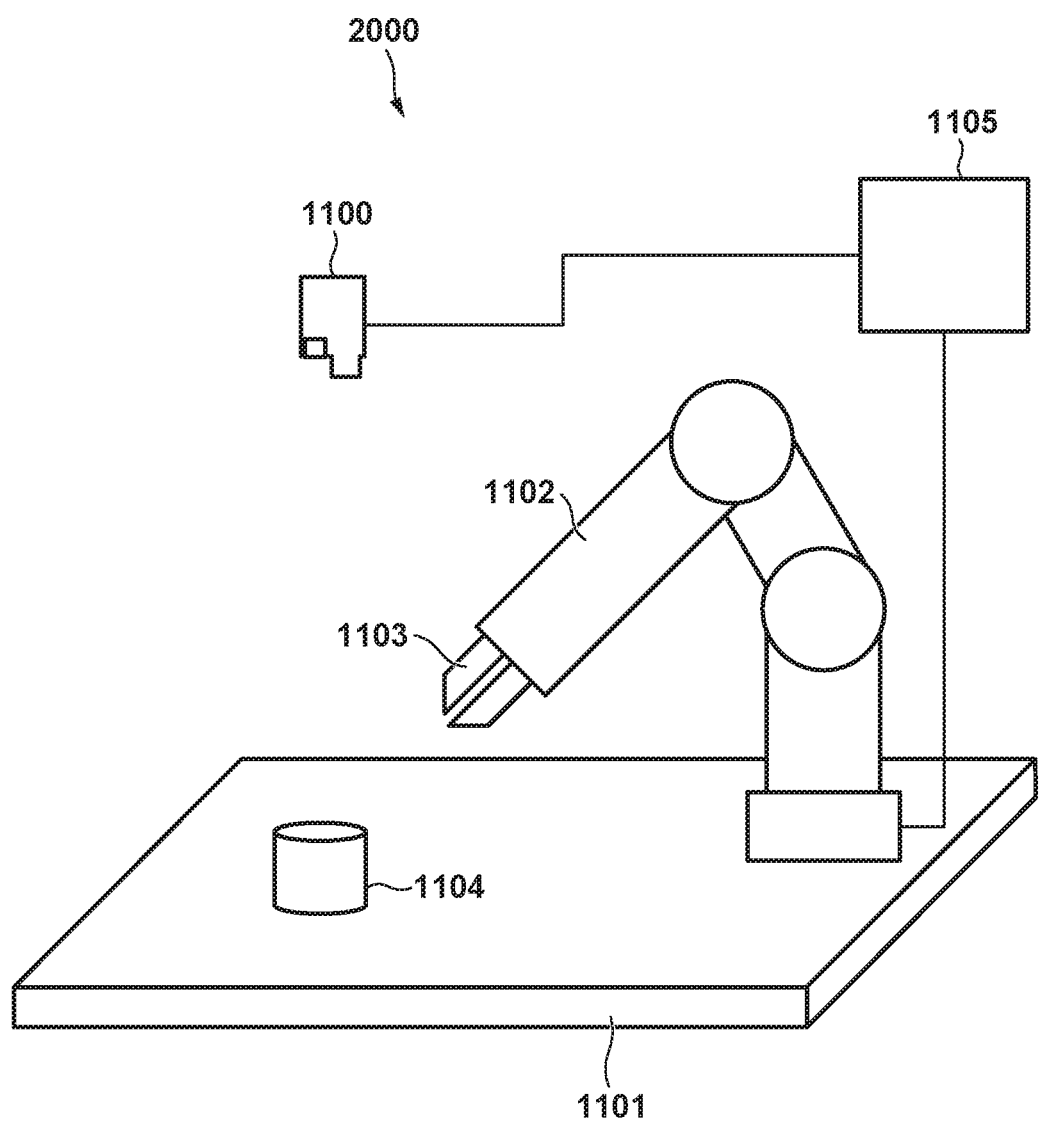
FIG. 11 is a schematic diagram showing an example of a robot according to a second embodiment.
Figure 12:
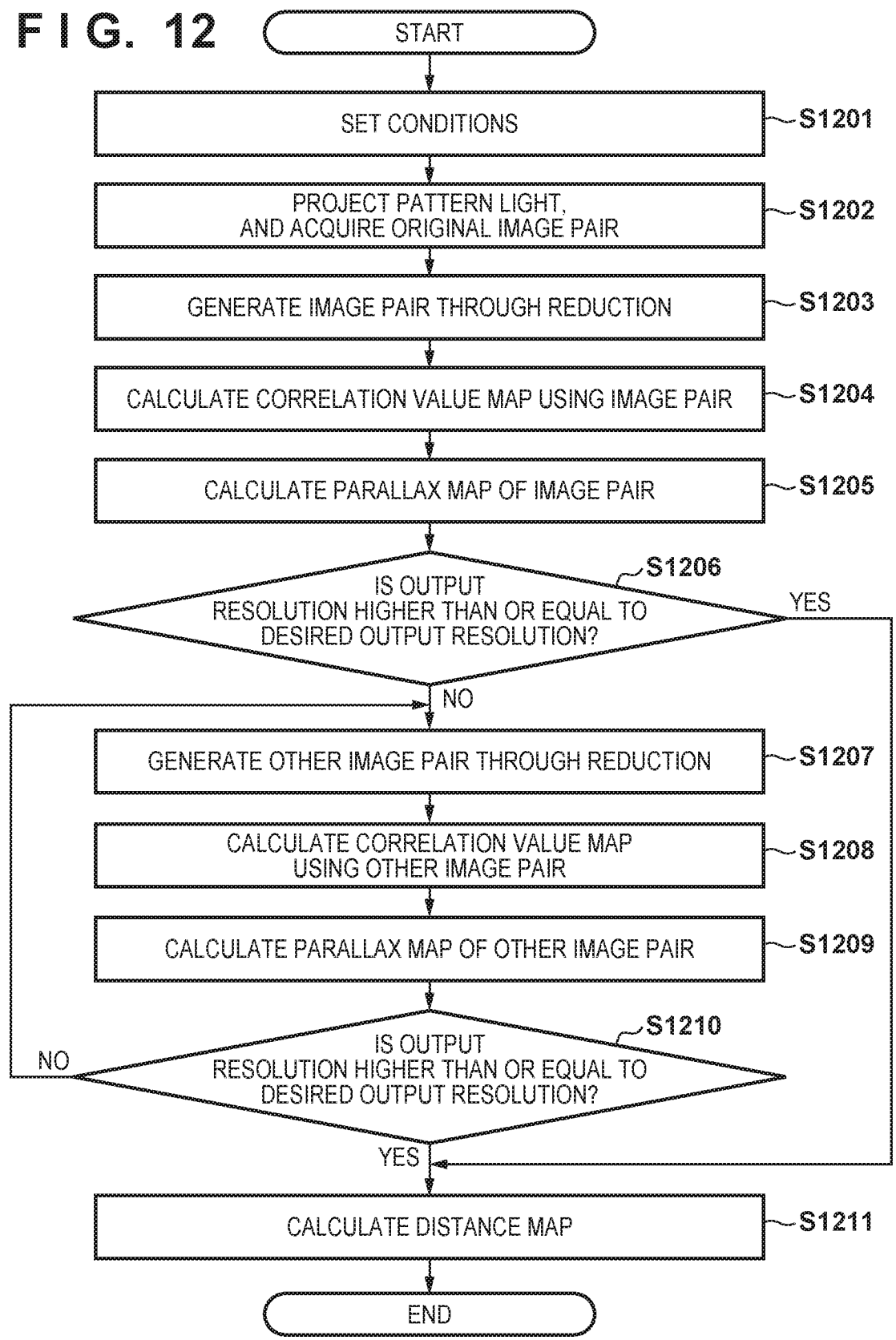
FIG. 12 shows an example of a flow of a distance detection method according to the second embodiment.

FIG. 11 shows a robot 2000 of the FA inspection apparatus according to the second embodiment. The robot 2000 has the image capturing apparatus 1100, a work stage 1101, a robot arm 1102, a robot hand 1103, and a control apparatus 1105. Based on depth information acquired using the image capturing apparatus 1100, the control apparatus 1105 controls the robot arm 1102 and the robot hand 1103 so as to hold a work piece 1104 that is a main subject. FIG. 12 shows a flow related to calculation of depth information in this holding operation.

In step S1201, various conditions such as measurement speed, reference frequency, a region of interest, the number of pixels to be obtained through thinning out, a magnification, a projection condition, and an image capturing condition are set. For example, the user sets the measurement speed. The measurement speed may be an actual speed, or may be selected by the user from levels that have been set in advance such as "high speed/moderate speed/low speed". Preliminary image capturing is performed by the image capturing apparatus 1100, a magnification m, and pattern light (a projection pattern) to be projected, or an image capturing condition of the image capturing apparatus 1100 are set, and a reference frequency f is set, in accordance with the measurement speed.

Figure 13:
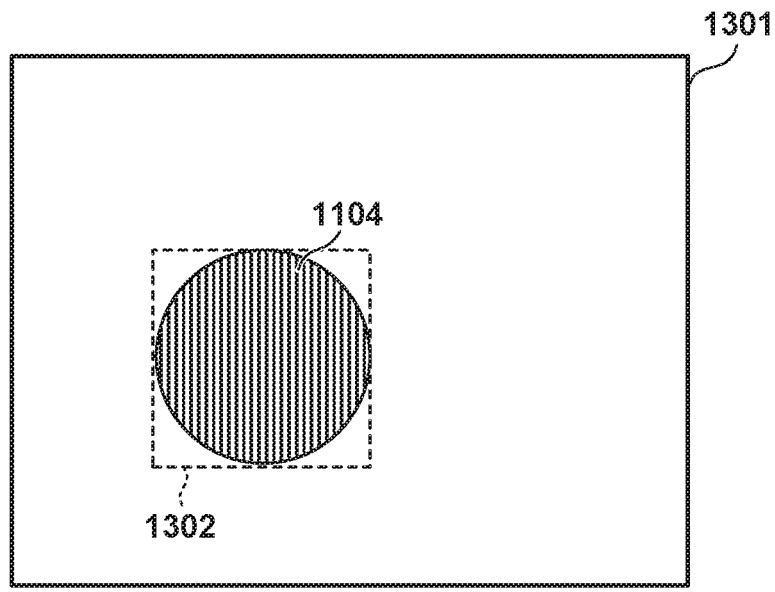
FIG. 13 shows an example of an image acquired in preliminary image capturing.

FIG. 13 shows a captured image 1301 acquired by preliminarily capturing an image of the work piece 1104. In step S1202, the control apparatus 1105 sets a region in which the work piece 1104 is shown, as an ROI (Region of Interest) 1302. Next, the control apparatus 1105 calculates a magnification corresponding to the measurement speed that has been set in step S1201. Specifically, when a "high speed" mode is set, the control apparatus 1105 calculates a magnification m_ROI so as to thin out the pixels of image of the ROI 1302 to every $10^{th}$ pixel. At this time, the control apparatus 1105 sets the conditions of a projection apparatus (not illustrated) or the image capturing apparatus 1100 such that the relationship between the magnification m_ROI and the spatial frequency f of the captured image 1301 (pattern light that is superimposed on the work piece 1104) satisfies Expression (4) below. Alternatively, the control apparatus 1105 sets the magnification m_ROI to satisfy Expression (4) below.

$$5f \leq m\_ROI \leq 3f \qquad (4)$$

For example, in the case of fixing the conditions of the image capturing apparatus 1100, the control apparatus 1105 changes the conditions of the spatial modulator 504 in the projection apparatus, and performs control such that the spatial frequency f of the captured image 1301 satisfies the relationship of Expression (4) above. After that, processes of steps S1202 to S1210 are performed, and the control apparatus 1105 calculates a distance map in step S1211. Note that steps S1202 to S1210 are the same as steps S601 to S609 described in the first embodiment, and thus a description thereof is omitted. The control apparatus 1105 controls the robot arm 1102 and the robot hand 1103 based on the distance map calculated in step S1211, so as to hold the work piece 1104.

As described above, the image capturing apparatus of the second embodiment has the speed setting mode for calculating a parallax map at a predetermined speed by setting a region of interest in a captured image of a measurement target. Accordingly, an ROI is set on a main subject of interest, a magnification that is based on a purpose is set, and reduction is performed, and thereby a distance map can be calculated at a predetermined calculation speed. In addition, the control apparatus 1105 may be able to control the robot arm 1102 and the robot hand 1103 upon receiving depth information (a depth map) not in the form of distance values (distance map) but in the form of parallax amounts (a parallax map) or defocus amounts (a defocus map). In this case, step S1206 for calculating a distance map is unnecessary.

In step S1201, the user may directly set the number of pixels or the magnification for performing thinning out. Accordingly, the user can perform fine adjustment according to their purpose, and thus the usability can be improved. In addition, in step S1201, for each speed item that has been set in advance, the number of pixels or the magnification for performing thinning out may be set by the user in advance. Accordingly, the usability can be improved.

Preliminary image capturing in step S1201 can be omitted by storing, in advance to a memory, the shape of the target work piece and an image-capturing field angle that is used for measurement. In addition, the image capturing apparatus of the second embodiment may have an automatic determination mode for recognizing a subject from a captured image of a measurement target, and automatically determining various variables. For example, the control apparatus 1105 may automatically set a magnification and a reference frequency based on a work piece whose image has been captured and shape information registered in advance, by using various image recognition techniques. Accordingly, the usability can be improved. In addition, the user may manually set an ROI, or the control apparatus 1105 may automatically set an ROI when a target work piece is recognized through various types of image recognition.

The reference frequency f can be the largest amount of components in a spatial frequency distribution in an original image pair. For example, by performing frequency analysis on an image pair (original image pair) obtained through preliminary image capturing, the region that has the largest amount of spatial frequency components can be set as an ROI, and the spatial frequency of the ROI can be set as the reference frequency f. Accordingly, the ROI and the reference frequency f can be set automatically. In addition, the reference frequency f can be a spatial frequency on a focusing plane in an original image pair. For example, a focal position of an image pair (original image pair) during preliminary image capturing is calculated by performing contrast analysis or preliminary distance value measurement, and the region of the focal position is set as an ROI. By setting the spatial frequency of the region of the focal position as the reference frequency f, the ROI and the reference frequency f can be set automatically. Furthermore, the reference frequency f can be the highest spatial frequency in an original image pair. For example, by performing frequency analysis on an image acquired through preliminary image capturing, a region that has the highest spatial frequency components is set as an ROI. By setting the spatial frequency of the region as the reference frequency f, the ROI and the reference frequency f can be set automatically.

Figure 14:
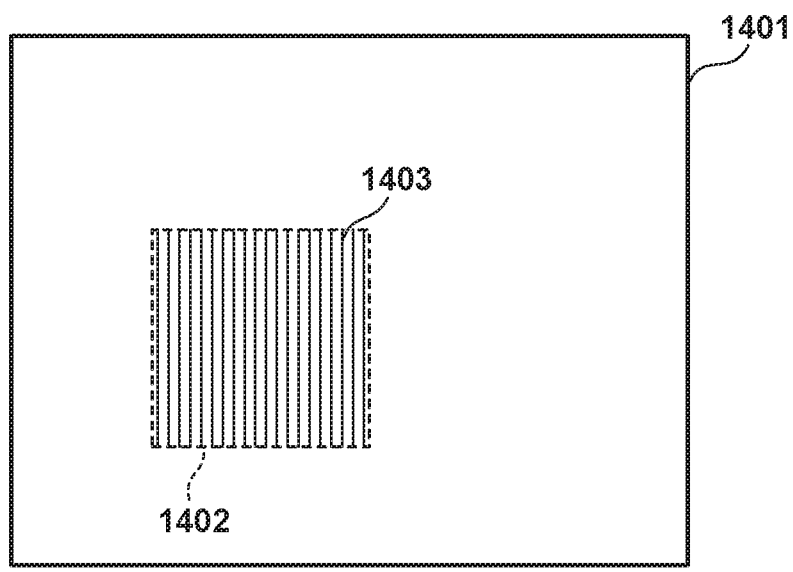
FIG. 14 is a schematic diagram showing an example of a user interface according to the second embodiment.

The robot 2000 may have a user interface that assists the user when setting a projection condition, an image capturing condition, and the like to satisfy the measurement condition according to the second embodiment. This user interface can make operations easy. FIG. 14 shows an example of a user interface for setting an ROI. The robot 2000 has a display element 1401 that is a touch panel for displaying a captured image. On this display element 1401, the user sets an ROI by touching a measurement range 1402. At this time, the display element 1401 displays, as a grid 1403, a projection pattern of a spatial frequency that satisfies Expression (4) above, for a magnification corresponding to the measurement speed or the number of pixels for performing thinning out, which has been set in advance. The user changes the shape of a pattern projected by the projection apparatus (projection pattern), or optical conditions of projection or image capturing, based on this display.

Third Embodiment

High Accuracy Mode

Subsequently, a high accuracy mode of an image capturing apparatus according to a third embodiment will be described. Regarding setting of a magnification for generating a reduced-size image, a reduced-size image whose in-plane resolution is highest is generated when thinning out is performed to every second pixel. At this time, a magnification M (=1/a) is the maximum magnification, namely 0.5. The image capturing apparatus according to the third embodiment has a high accuracy mode in which the magnification M is set to the maximum value. This magnification M in the case of sampling every second pixel matches a Nyquist frequency f_nyq that depends on the image sensor, specifically, the pixel interval of the image sensor.

Therefore, in the high accuracy mode of the third embodiment, the magnification M=f_nyq is satisfied, and, in addition, the reference frequency f satisfies Expression (3) above. Specifically, in a case of setting every second pixel as a sampling pixel for the high accuracy mode, the reference frequency f on an acquired original image pair is set to satisfy Expression (5). For example, a projection condition or an image capturing condition of a pattern image capturing unit is set to satisfy Expression (5).

$$(1/3)*f\_nyq \geq f \geq (1/5)*f\_nyq \qquad (5)$$

By setting the reference frequency f in this manner, even in the case of the most accurate reduced-size image (even in a case of setting every second pixel as a sampling pixel), it is possible to suppress degradation of the signal shapes of an original image pair. Accordingly, a parallax map can be calculated accurately, and thus distance measurement can be performed accurately.

OTHER EMBODIMENTS

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Applications No. 2018-067512, filed on Mar. 30, 2018 and No. 2019-052735, filed on Mar. 20, 2019, which are hereby incorporated by reference herein in their entirety.

What is claimed is:

1. An apparatus comprising:
at least one processor;
a memory coupled to the at least one processor, the memory having instructions that, when executed by the at least one processor, performs operations as:
an acquisition unit that captures an image of a measurement target onto which pattern light is projected, and acquires an original image pair that has a parallax;
a reduction unit that reduces a size of the original image pair; and
a calculator that calculates, from an image pair that is obtained by the reduction unit, a parallax map that is a distribution of parallax amounts corresponding to regions of the image pair, using predetermined search ranges and search windows in the respective regions,
wherein, in order to obtain a parallax map that has a predetermined number of pieces of data, the calculator calculates parallax maps in a plurality of hierarchies, respectively, in which a hierarchy where a parallax map is calculated using an image pair obtained by the reduction unit with a lowest magnification is set as a lowest hierarchy, and the predetermined search ranges for calculating the parallax maps in the respective hierarchies are determined based on a parallax map in an immediately lower hierarchy, and
wherein a magnification m that is a magnification for obtaining the parallax map in the lowest hierarchy when the reduction unit reduces the size of the original image pair and a reference frequency f, on the original image pair, of the pattern light that is projected onto the measurement target satisfy a predetermined condition.

2. The apparatus according to claim 1, wherein a relationship between the magnification m and the reference frequency f satisfies a following condition:

$$5 \geq m \geq 3f.$$

3. The apparatus according to claim 1,
wherein the magnification m is set to satisfy the condition.

4. The apparatus according to claim 1,
wherein a projection pattern of the pattern light or an image capturing condition used by the acquisition unit is set to satisfy the predetermined condition (or a condition).

5. The apparatus according to claim 1,
wherein the reference frequency f is (1) a largest amount of components in a distribution of spatial frequencies, (2) a spatial frequency on a focusing plane, or (3) a highest spatial frequency in the original image pair.

6. The apparatus according to claim 1,
wherein a speed setting mode is provided in which, by setting a region of interest corresponding to the measurement target in a captured image, the calculator calculates a parallax map at a predetermined speed.

7. The apparatus according to claim 1,
wherein a high accuracy mode is provided in which a magnification when the reduction unit reduces the size the original image pair is a maximum value, and, with respect to a Nyquist frequency f_nyq that depends on an image sensor, a condition of at least one of the acquisition unit and the calculator is set such that the magnification and the reference frequency f, on the original image pair, of the pattern light that is projected onto the measurement target satisfy the following condition:

$$(1/3)*f\_nyq \geq f \geq (1/5)*f\_nyq.$$

8. A method comprising:
capturing an image of a measurement target onto which pattern light is projected, and acquiring an original image pair that has a parallax;
reducing a size of the original image pair; and
calculating, from an image pair that is obtained by the reducing, a parallax map that is a distribution of parallax amounts corresponding to regions of the image pair, using predetermined search ranges and search windows in the respective regions,
wherein, in order to obtain a parallax map that has a predetermined number of pieces of data, the calculating calculates parallax maps in a plurality of hierarchies, respectively, in which a hierarchy where a parallax map is calculated using an image pair obtained by the reducing with a lowest magnification is set as a lowest hierarchy, and the predetermined search ranges for calculating the parallax maps in the respective hierarchies are determined based on a parallax map in an immediately lower hierarchy, and
wherein a magnification m that is a magnification for obtaining the parallax map in the lowest hierarchy when the reducing reduces the size of the original image pair and a reference frequency f, on the original image pair, of the pattern light that is projected onto the measurement target satisfy a predetermined condition.

9. The method according to claim 8,
wherein a relationship between the magnification m and the reference frequency f satisfies a following condition:

$$5f \geq m \geq 3f.$$

10. The method according to claim 8,
wherein the reference frequency f is (1) a largest amount of components in a distribution of spatial frequencies, (2) a spatial frequency on a focusing plane, or (3) a highest spatial frequency in the original image pair.

11. A method comprising:
capturing an image of a measurement target onto which pattern light is projected, and acquiring an original image pair that has a parallax;
reducing a size of the original image pair; and
calculating, from an image pair that is obtained by the reducing, a parallax map that is a distribution of parallax amounts corresponding to regions of the image pair, using predetermined search ranges and search windows in the respective regions,
wherein, in order to obtain a parallax map that has a predetermined number of pieces of data, the calculating calculates parallax maps in a plurality of hierarchies, respectively, in which a hierarchy where a parallax map is calculated using an image pair obtained by the reducing with a lowest magnification is set as a lowest hierarchy, and the predetermined search ranges for calculating the parallax maps in the respective hierarchies are determined based on a parallax map in an immediately lower hierarchy, and
wherein a speed setting mode is provided in which, by setting a region of interest corresponding to the measurement target in a captured image, the calculating calculates a parallax map at a predetermined speed.

12. A method comprising:
capturing an image of a measurement target onto which pattern light is projected, and acquiring an original image pair that has a parallax;
reducing a size of the original image pair; and
calculating, from an image pair that is obtained by the reducing, a parallax map that is a distribution of parallax amounts corresponding to regions of the image pair, using predetermined search ranges and search windows in the respective regions,
wherein, in order to obtain a parallax map that has a predetermined number of pieces of data, the calculating calculates parallax maps in a plurality of hierarchies, respectively, in which a hierarchy where a parallax map is calculated using an image pair obtained by the reducing with a lowest magnification is set as a lowest hierarchy, and the predetermined search ranges for calculating the parallax maps in the respective hierarchies are determined based on a parallax map in an immediately lower hierarchy, and
wherein a high accuracy mode is provided in which a magnification when the reducing reduces the size the original image pair is a maximum value, and, with respect to a Nyquist frequency f_nyq that depends on an image sensor, a condition of at least one of the acquiring and the calculating is set such that the magnification and the reference frequency f, on the original image pair, of the pattern light that is projected onto the measurement target satisfy the following condition:

$$(1/3)*f\_nyq \geq f \geq (1/5)*f\_nyq.$$

13. A non-transitory readable storage medium storing a computer-executable program of instructions for causing a computer to perform a method comprising:
capturing an image of a measurement target onto which pattern light is projected, and acquiring an original image pair that has a parallax;
reducing a size of the original image pair; and
calculating, from an image pair that is obtained by the reducing, a parallax map that is a distribution of parallax amounts corresponding to regions of the image pair, using predetermined search ranges and search windows in the respective regions,
wherein, in order to obtain a parallax map that has a predetermined number of pieces of data, the calculating calculates parallax maps in a plurality of hierarchies, respectively, in which a hierarchy where a parallax map is calculated using an image pair obtained by the reducing with a lowest magnification is set as a lowest hierarchy, and the predetermined search ranges for calculating the parallax maps in the respective hierarchies are determined based on a parallax map in an immediately lower hierarchy, and
wherein a magnification m that is a magnification for obtaining the parallax map in the lowest hierarchy when the reducing reduces the size of the original image pair and a reference frequency f, on the original image pair, of the pattern light that is projected onto the measurement target satisfy a predetermined condition.

14. The non-transitory readable storage medium according to claim 13,
wherein a relationship between the magnification m and the reference frequency f satisfies a following condition:

$$5f \geq m \geq 3f.$$

15. The non-transitory readable storage medium according to claim 13,
wherein the reference frequency f is (1) a largest amount of components in a distribution of spatial frequencies, (2) a spatial frequency on a focusing plane, or (3) a highest spatial frequency in the original image pair.

16. A non-transitory readable storage medium storing a computer-executable program of instructions for causing a computer to perform a method comprising:
capturing an image of a measurement target onto which pattern light is projected, and acquiring an original image pair that has a parallax;
reducing a size of the original image pair; and
calculating, from an image pair that is obtained by the reducing, a parallax map that is a distribution of parallax amounts corresponding to regions of the image pair, using predetermined search ranges and search windows in the respective regions,
wherein, in order to obtain a parallax map that has a predetermined number of pieces of data, the calculating calculates parallax maps in a plurality of hierarchies, respectively, in which a hierarchy where a parallax map is calculated using an image pair obtained by the reducing with a lowest magnification is set as a lowest hierarchy, and the predetermined search ranges for calculating the parallax maps in the respective hierarchies are determined based on a parallax map in an immediately lower hierarchy, and
wherein a speed setting mode is provided in which, by setting a region of interest corresponding to the measurement target in a captured image, the calculating calculates a parallax map at a predetermined speed.

17. A non-transitory readable storage medium storing a computer-executable program of instructions for causing a computer to perform a method comprising:
capturing an image of a measurement target onto which pattern light is projected, and acquiring an original image pair that has a parallax;
reducing a size of the original image pair; and
calculating, from an image pair that is obtained by the reducing, a parallax map that is a distribution of parallax amounts corresponding to regions of the image pair, using predetermined search ranges and search windows in the respective regions,
wherein, in order to obtain a parallax map that has a predetermined number of pieces of data, the calculating calculates parallax maps in a plurality of hierarchies, respectively, in which a hierarchy where a parallax map is calculated using an image pair obtained by the reducing with a lowest magnification is set as a lowest hierarchy, and the predetermined search ranges for calculating the parallax maps in the respective hierarchies are determined based on a parallax map in an immediately lower hierarchy, and
wherein a high accuracy mode is provided in which a magnification when the reducing reduces the size the original image pair is a maximum value, and, with respect to a Nyquist frequency f_nyq that depends on an image sensor, a condition of at least one of the acquiring and the calculating is set such that the magnification and the reference frequency f, on the original image pair, of the pattern light that is projected onto the measurement target satisfy the following condition:

$(1/3)*f\_nyq \geq f \geq (1/5)*f\_nyq$.

18. An apparatus comprising:
at least one processor;
a memory coupled to the at least one processor, the memory having instructions that, when executed by the at least one processor, performs operations as:
an acquisition unit that captures an image of a measurement target onto which pattern light is projected, and acquires an original image pair that has a parallax;
a reduction unit that reduces a size of the original image pair; and
a calculator that calculates, from an image pair that is obtained by the reduction unit, a parallax map that is a distribution of parallax amounts corresponding to regions of the image pair, using predetermined search ranges and search windows in the respective regions,
wherein, in order to obtain a parallax map that has a predetermined number of pieces of data, the calculator calculates parallax maps in a plurality of hierarchies, respectively, in which a hierarchy where a parallax map is calculated using an image pair obtained by the reduction unit with a lowest magnification is set as a lowest hierarchy, and the predetermined search ranges for calculating the parallax maps in the respective hierarchies are determined based on a parallax map in an immediately lower hierarchy, and
wherein a speed setting mode is provided in which, by setting a region of interest corresponding to the measurement target in a captured image, the calculator calculates a parallax map at a predetermined speed.

19. An apparatus comprising:
at least one processor;
a memory coupled to the at least one processor, the memory having instructions that, when executed by the at least one processor, performs operations as:
an acquisition unit that captures an image of a measurement target onto which pattern light is projected, and acquires an original image pair that has a parallax;
a reduction unit that reduces a size of the original image pair; and
a calculator that calculates, from an image pair that is obtained by the reduction unit, a parallax map that is a distribution of parallax amounts corresponding to regions of the image pair, using predetermined search ranges and search windows in the respective regions,
wherein, in order to obtain a parallax map that has a predetermined number of pieces of data, the calculator calculates parallax maps in a plurality of hierarchies, respectively, in which a hierarchy where a parallax map is calculated using an image pair obtained by the reduction unit with a lowest magnification is set as a lowest hierarchy, and the predetermined search ranges for calculating the parallax maps in the respective hierarchies are determined based on a parallax map in an immediately lower hierarchy, and
wherein a high accuracy mode is provided in which a magnification when the reduction unit reduces the size the original image pair is a maximum value, and, with respect to a Nyquist frequency f_nyq that depends on an image sensor, a condition of at least one of the acquisition unit and the calculator is set such that the magnification and the reference frequency f, on the original image pair, of the pattern light that is projected onto the measurement target satisfy the following condition:

$(1/3)*f\_nyq \geq f \geq (1/5)*f\_nyq$.

* * * * *